United States Patent [19]

Hagiwara

[11] 4,017,878
[45] Apr. 12, 1977

[54] BAYONET MOUNT ADAPTER FOR A CAMERA

[75] Inventor: Teruo Hagiwara, Kawagoe, Japan

[73] Assignee: Asahi Kogaku Kogyo Kabushiki Kaisha, Tokyo, Japan

[22] Filed: July 7, 1975

[21] Appl. No.: 593,548

[30] Foreign Application Priority Data

July 5, 1974 Japan .................. 49-78710[U]

[52] U.S. Cl. .................. 354/286; 350/257
[51] Int. Cl.² ...................... G03B 17/00
[58] Field of Search .......... 354/202, 286; 350/252, 350/257

[56] References Cited

UNITED STATES PATENTS 2,780,137   2/1957   Bourgeois .................. 350/257

FOREIGN PATENTS OR APPLICATIONS 1,900,677   10/1969   Germany .................. 354/286

*Primary Examiner*—John Gonzales
*Attorney, Agent, or Firm*—McNenny, Pearne, Gordon, Gail, Dickinson & Schiller

[57] ABSTRACT

A bayonet mount adapter for attaching a screw-mount lens barrel to a camera of the bayonet mount type is provided. The adapter has a cylindrical sidewall portion extending between a flange and external adapter claws. The sidewall portion has an outer circumference sized to be received within the internal claws of the bayonet mount. A leaf spring having one end fixed to the sidewall tangentially extends to an opposite end disposed radially outward of the outer circumference of the sidewall. Upon positioning the adapter in the bayonet mount, the leaf spring is biased by the internal claws of the camera bayonet mount to a position within the outer circumference of the sidewall and the adapter is rotated to a stop position wherein the internal claws of the camera bayonet mount are entrapped between the flange and the external adapter claws of the mount adapter. At the stop position, the second end of the leaf spring is free to move radially outward into engagement with a rotation stopper fixed to the bayonet mount. The leaf spring can be manually biased out of engagement with the rotation stopper for purposes of rotating and disengaging the adapter from the bayonet mount.

7 Claims, 9 Drawing Figures

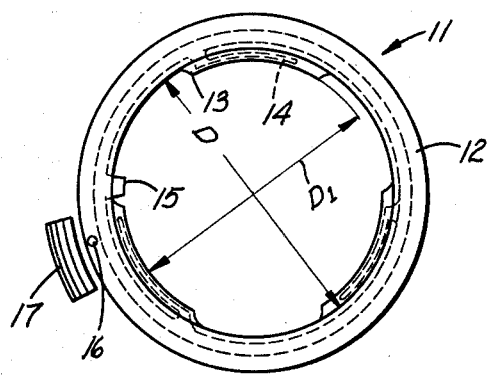
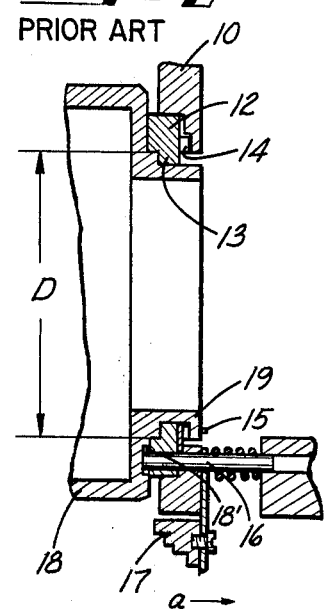
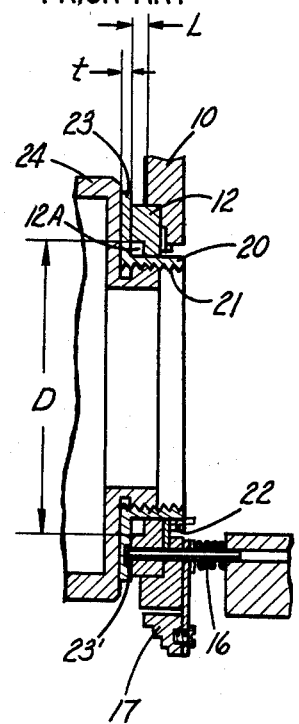
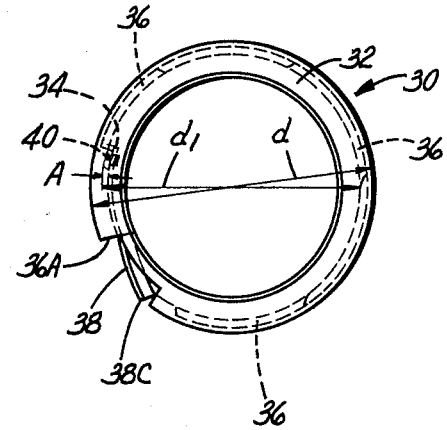
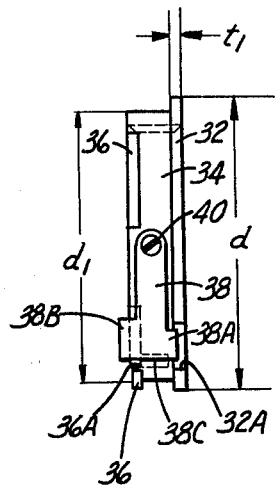

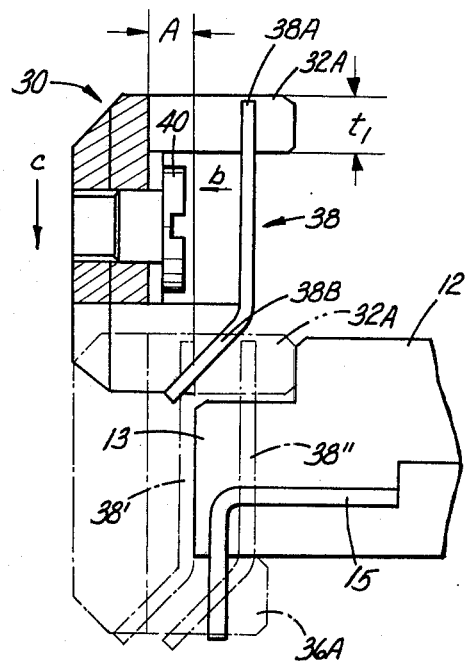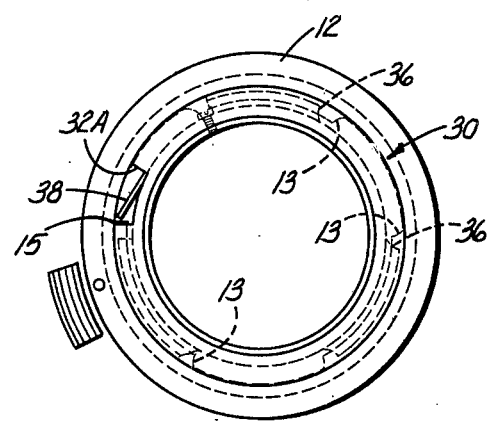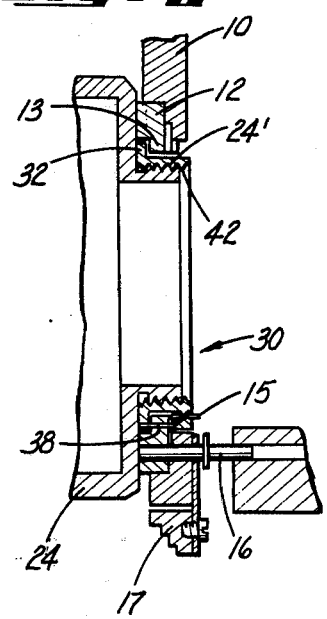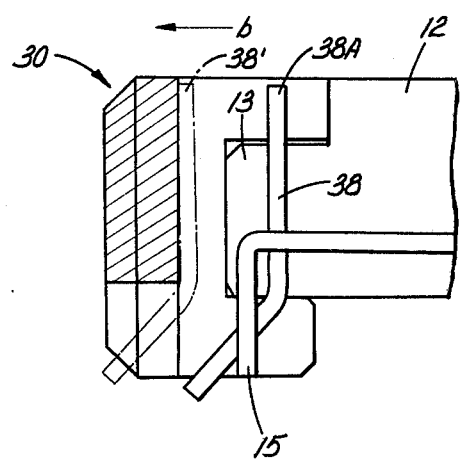

BAYONET MOUNT ADAPTER FOR A CAMERA

BACKGROUND OF THE INVENTION AND PRIOR ART

The present invention relates to a bayonet mount adapter for a camera of the interchangeable lens type.

The bayonet system and the screw-in system are commonly employed for mounting interchangeable lenses to cameras. As is well-known, the use of a bayonet mount adapter having an internal thread adapted for a screw-in lens mount and also having an external catch adapted to secure a bayonet mount in position enables the mounting of a lens barrel of the screw-in type to a camera body of the bayonet mount type.

A method currently adopted in a camera of the bayonet mount type for securing a bayonet type lens in position is to arrange a manually operable lock pin on the mount surface on the camera side and to cut a groove or recess in the mount surface on the lens side for entrapping the lock pin. In this mechanism, the locked lens is released by manually actuating the lock pin externally of the mount surface.

When attaching a bayonet mount adapter to a camera of the bayonet mount type, the bayonet mount adapter may be secured to the camera body in a manner similar to the attachment of the bayonet type lens by engaging the lock pin on the camera side into a groove or recess cut in the adapter. Thus a screw-in lens may be secured to the camera body by screwing it into the previously secured mount adapter. This method, however, is disadvantageous in that the thickness of the adapter flange is added to the flange back (or mechanical back) of the camera body. Specifically, the screw-in type lens is operative only when the mechanical back thereof is larger than that of the associated camera body. In order to avoid the foregoing problem, the thickness of the mount adapter flange may effectively be reduced to zero by bringing the mount reference plane of the screw-in lens into the same plane as the mount reference plane of the camera body.

The above-mentioned method is disclosed in Japanese Utility Model Publication 1974-2,200, wherein the flange portion of the mount adapter can be received in a space axially defined between the front surface and mount surface of a known bayonet mount on the camera side, so that the mechanical back of the screw-in type lens is brought into the same plane as the mechanical back of the camera body to thereby allow a photographing operation. However, in a camera having a mount lock pin arranged in the mount reference plane, the adapter is received in the mount reference plane and therefore cannot be secured unrotatingly.

It is therefore an object of this invention to provide means for securing the mount adapter unrotatingly. According to this invention a lock member is arranged on the mount adapter so that the mount adapter can be locked positively without using the lock mechanism on the camera side, thereby permitting the use of a screw-in type lens.

The bayonet mount adapter of this invention is so constructed that it can be received in the bayonet mount on the camera side in either the same plane as or in a slightly lower plane (0.1 – 0.2mm) than the mount reference plane as measured in the axial direction of the bayonet mount washer on the camera side. The mount adapter carries a leaf spring on its outer circumferential surface so that, when it is fitted into the bayonet on the camera side, the leaf spring is engaged with the projection formed on the bayonet on the camera side to thereby prevent the adapter from rotating and loosening. When removing the adapter from the camera body, the engagement between the leaf spring and projection can be released manually at the top or exposed forward surface of the adapter.

BRIEF DESCRIPTION OF THE DRAWINGS

FIG. 1 is a front elevational view of a prior art bayonet mount which is arranged for use with a lock pin;

FIG. 2 is a fragmentary, axial sectional view of the bayonet mount of FIG. 1 secured to a camera and coupled with a bayonet lens barrel, with parts broken away for purposes of illustration;

FIG. 3 is a fragmentary, axial sectional view similar to FIG. 2 illustrating the use of a prior art mount adapter to secure a lens barrel of the screw-in type to the bayonet mount and camera;

FIG. 4 is a front elevational view of a mount adapter in accordance with the present invention;

FIG. 5 is a side elevational view of the mount adapter of FIG. 4;

FIG. 6 is a schematic rectilinear development of the arrangement of elements around the mount adapter as viewed from the top in FIG. 5, and also shows the engagement of the mount adapter with a bayonet mount, with parts omitted and broken away for purposes of illustration;

FIG. 7 is a front elevational view showing the engaged mount adapter and bayonet mount of FIG. 6;

FIG. 8 is a fragmentary axial sectional view of the mount adapter in accordance with the present invention coupled with the bayonet mount and securing the screw mount lens to a camera, with parts omitted and broken away for purposes of illustration; and FIG. 9 is a schematic view similar to FIG. 6 showing the disengagement of the mount adapter from the bayonet mount.

DETAILED DESCRIPTION OF THE DRAWINGS

Referring to FIGS. 1 and 2, a camera housing 10 of a camera of the interchangeable lens type is shown with a bayonet mount 11 secured thereto. The bayonet mount 11 includes as its principal parts a bayonet washer 12 which is attached to the camera housing 10, internal claws 13 which are formed on the bayonet washer 12, a bayonet spring 14 and a rotation stopper 15 which is integral with the bayonet spring 14. The rotation stopper 15 is bent in a radially inwardly direction at its forward end.

A bayonet barrel 18 of a camera lens is shown secured to the bayonet mount 11 in FIG. 2. The bayonet barrel 18 has external claws 19 formed thereon for engagement with the internal claws 13 of the bayonet mount. The rotational engagement of the bayonet barrel 18 is stopped by the rotation stopper 15 at a position wherein a lock pin 16 extending through the bayonet washer 12 is engaged in a groove or recess 18' in the mount surface of the bayonet barrel 18 to prevent the unintended rotation and disengagement of the bayonet barrel. The lock pin 16 is axially movable by the operation of an external release button 17 which is arranged on the bayonet washer 12.

To remove the bayonet barrel 18, the release button 17 is manually depressed in the direction of the arrow $a$ to disengage the lock pin 16 from the groove 18'. Upon disengagement of the lock pin 16, the bayonet barrel 18 is reversely rotated and the internal claws 13 are disengaged from the external claws 19 to thereby allow the removal of the bayonet barrel 18 from the camera body.

Referring to FIG. 3, a conventional method for mounting a screw-in type lens to a camera having the above described structure is illustrated. In this method, a prior art mount adapter 20 is engaged with the bayonet washer 12 which is attached to the camera housing 10. The mount adapter 20 includes an internal thread 21, bayonet external claws 22 adapted to engage the internal claws 13 on the washer 12 and a flange 33 having a thickness $t$ and a groove 23' cut in the rear surface thereof for entrapping the lock pin 16. An externally threaded lens barrel 24 is threadedly engaged with the mount adapter 20.

As indicated above, the use of such a threaded mount adapter adds the thickness $t$ of the adapter flange 23 to the mount surface on the camera side and provides a corresponding increase in the length of the camera's mechanical back. As a result thereof, when screw-in type lenses having a mechanical back equal to or shorter than the length of the camera's mechanical back are attached to the mount adapter, the photographing range of the lens will be limited because the lens can be focused only to subjects at very short distances and subjects at long distances cannot be photographed.

The use of the mount adapter 20 will offset the mounted lens position in an axially forward direction by a distance corresponding to the thickness $t$ of the mount adapter flange 23. This may be compensated for by making the flange thickness $t$ effectively zero by disposing the forward surface of the flange 23 in the same plane as the surface of the washer 12 against which the lens barrel 24 is to be engaged (FIG. 3). In this manner, the mechanical back of the lens may be made identical with the mechanical back of the camera and hence the lens may be rendered operative over the full range.

For this purpose, the aforementioned Japanese Utility Model Publication 1974-2,200 discloses the provision of a recess 12A having an inner diameter of D and a depth of L in the washer 12 to receive the bayonet adapter flange so that the reference plane of the lens' mechanical back is coplanar to the mount attaching surface of the washer 12. This technique apparently allows the screw-in type lens to operate optically in a satisfactory manner. However, the mount adapter in such an arrangement cannot be engaged with the bayonet lock pin 16 which is disposed radially outward of the recess 12A since such a mount adapter is received within the area of the inner diameter D. Accordingly, a mount adapter of this construction is only held in position by the pressing force of the bayonet spring 14 so as to give rise to the possibility of lens play and disengagement. The present invention overcomes the foregoing disadvantages by positively securing the mount adapter to the bayonet washer 12 at a position radially inward of the lock pin 16 on the washer 12 and without the use of the lock pin.

Referring to FIGS. 4 and 5, a bayonet mount adapter 30 in accordance with the present invention is shown. The mount adapter 30 includes a radially extending flange 32, a rearwardly extending, substantially cylindrical sidewall portion 34, and external claws 36. The mount adapter has an outer diameter $d$ which is slightly smaller than the inner diameter D of the recess 12A formed in the bayonet washer 12. The flange 32 has a thickness $t_1$ which is selected to be slightly smaller (0.1 – 0.2mm) than the depth L of the recess 12A.

A leaf spring 38 resiliently acting in a radially outward direction is fixed by a screw 40 at a position between the flange 32 and the external claws 36. A first side edge 38A of the leaf spring 38 projects into a notched portion or opening 32A formed in the flange 32, and it terminates at a position slightly lower than the forward or outer face of the flange. The second or opposite side edge 38B of the leaf spring 38 is bent radially inwardly, and it is received within a partly notched end 36A of the mount adapter 30. The leaf spring 38 extends substantially tangentially relative to the sidewall portion 34 from its fixed end which is within the outside diameter $d_1$ of the mount adapter 30 to a forward end portion or edge 38C which is disposed radially outward of both the outer diameter $d_1$ of the mount adapter and the inner diameter $D_1$ of the internal claws 13.

The outer diameter $d_1$ of the circular cylindrical mount adapter 30 is smaller than the inner diameter $D_1$ of the inner claws 13 formed on the washer 12 on the camera's side. The sidewall 34 of the mount adapter is so dimensioned that the dimension A, or the total dimension of the sidewall 34 thickness, thickness of the leaf spring 38 and thickness of the head portion of the screw 40 is in the outer diameter $d_1$. More specifically, when the mount adapter 30 is engaged into the inner diameter $D_1$ of the internal claws 13 formed on the washer 12 (FIG. 1), the portion to which the leaf spring 38 is attached projects by the dimension of A into the outer diameter $d_1$ of the mount adapter.

Accordingly, when the mount adapter 30 is fitted into the washer 12 as shown in FIG. 6, the bent edge portion 38B of the leaf spring 38 is engaged with an internal claw 13 formed on the washer 12 and the leaf spring is displaced in the direction of the arrow $b$. Thus, the outer circumference of the mount adapter (outer diameter $d_1$) is brought into engagement with the inner edge of the internal claw 13 as the mount adapter is axially moved in the direction of the arrow $c$ and into engagement with the bayonet mount 11. When the mount adapter 30 is rotated in a clockwise direction as viewed in FIG. 4, both the external claws 36 and the internal claws 13 are resiliently bent to an inner position than the sidewall surface of the leaf spring 38 (or into the inner diameter $D_1$ of the internal claws 13) and the external claws 36 are rotated while keeping contact with the inner wall of the internal claws 13 until it stops rotating upon engagement with the stopper 15.

Referring to FIG. 6, the leaf spring 38 is initially biased to a position within the inner diameter $D_1$ as shown at 38' in phantom outline, and it is maintained in this position until the mount adapter is rotated to the stop position. At the stop position, the leaf spring 38 is released from the confining regulation of the internal claws 13 and it springs back to the position shown at 38" in phantom outline. The forward end portion 38C of the leaf spring 38 is engaged with the side surface of the bent portion of the stopper 15 in the stop position.

Referring to FIG. 7, in the position where the external claw 36 is engaged with the stopper 15, the forward end 38C of the leaf spring 38 is engaged with the mount adapter 30 from the opposite direction to thereby limit the rotation of the mount adapter. In other words, further rotation in a clockwise direction is prevented by the engagement of the stopper 15 and the radially extending face 36A of the external claw 36, and rotation in a counterclockwise direction is prevented by the engagement of the forward end 38C of the leaf spring 38 with the stopper 15. This permits the screw-in type lens barrel 24 to be mounted and fixed against rotation without the use of the lock pin 16. Further, the dimension of the mechanical back of the mount adapter 30 is identical with the dimension of the mechanical back of the camera body.

Referring to FIG. 8, the screw-in lens barrel 24 is secured to the washer 12 and camera housing 10 by means of the mount adapter 30 in accordance with the present invention. The mount adapter 30 includes internal threads 42 which threadedly engage the external threads 24' of the lens barrel 24.

Referring to FIG. 9, the removal of the bayonet mount adapter 30 from the washer 12 on the camera side is illustrated. Initially, the screw-in type lens barrel 24 is disengaged. The leaf spring 38 is then manually displaced in the direction of the arrow b by movement of the end portion 38A thereof which projects into the notched portion or opening 32A in the mount adapter (FIG. 7). Accordingly, the leaf spring 38 is moved to the position 38' as shown in phantom outline in FIG. 9, and the mount adapter 30 is rotated in a counterclockwise direction to disengage it from the washer 12.

Although in the foregoing description the screw-in type lens is attached after mounting the mount adapter 30 to the washer 12, it may also be first attached to the mount adapter and then to the camera washer 12. In this case, each component operates substantially in the same manner as previously mentioned.

The mount adapter of the present invention efficiently enables the use of both bayonet and screw-in type lens mounts, and the adapter does not involve any error in focus adjustment because it can be secured in the same plane as the camera mount reference plane. Further, the adapter is simple in construction in that it can be manufactured by directly attaching a single leaf spring to a conventional adapter with minor structural modifications. The mount adapter of the present invention is also convenient to use. More particularly, a screw-in type lens can be mounted after attaching the bayonet mount to the camera body or, otherwise, it can be mounted first to the adapter and then to the camera body by screwing the adapter into the camera body.

What is claimed is:

1. A bayonet mount adapter for attaching to a camera of the bayonet type mount a lens barrel of the screw type mount having a screw mount diameter smaller than an inner claw diameter defined by the internal bayonet claws of the camera bayonet mount, said bayonet mount adapter including a substantially cylindrical sidewall portion having an outer circumference adapted to be received within the inner claw diameter and also having a resilient engaging element fixed thereto, said resilient engaging element having a first end thereof fixed to said sidewall portion and extending substantially tangentially from said sidewall portion to an opposite second end thereof disposed radially outward of the inner claw diameter, said bayonet mount adapter in a received position within the camera bayonet mount being relatively rotatable to a stop position with said resilient engaging element under the confining regulation of the internal bayonet claws and within the inner claw diameter, said resilient engaging element being free of said confining regulation at said stop position to allow movement of said second end thereof into engagement with a rotation stopper carried by the camera and located radially outward of the inner claw diameter, and said second end of said resilient engaging element being manually movable to a position radially inward of the inner claw diameter to disengage said resilient engaging element from the rotation stopper.

2. A bayonet mount adapter as set forth in claim 1 wherein said mount adapter includes a radially extending flange adjacent a first axial end of said sidewall portion and external adapter claws adjacent a second opposite axial end of said sidewall portion, said flange and said external adapter claws being adapted to entrap the internal bayonet claws therebetween at said stop position.

3. A bayonet mount adapter as set forth in claim 2 wherein said second end of said resilient engaging element includes a first axially extending portion received within an opening in said flange and a second axially extending portion extending through an opening in said external adapter claws.

4. A bayonet mount adapter as set forth in claim 3 wherein said first axially extending portion is exposed within said opening for manually moving and disengaging said resilient engaging element at said stop position.

5. A bayonet mount adapter as set forth in claim 3 wherein said second axially extending portion is radially inwardly bent for camming engagement with the internal bayonet claws to bias said resilient engaging element into said confining regulation of the internal bayonet claws.

6. A bayonet mount adapter as set forth in claim 2 wherein the engagement between said resilient engaging element and the rotation stopper at said stop position prevents rotation of said mount adapter in a first direction, and engagement between said external adapter claws and the rotation stopper prevents rotation of said mount adapter in a second opposite direction.

7. A bayonet mount adapter as set forth in claim 1 wherein said resilient engaging element comprises a leaf spring.

* * * * *